(12) United States Patent
Kim et al.

(10) Patent No.: US 12,414,168 B2
(45) Date of Patent: Sep. 9, 2025

(54) DISPLAY DEVICE AND AUDIO OUTPUT SYSTEM

(71) Applicant: LG ELECTRONICS INC., Seoul (KR)

(72) Inventors: Sanghun Kim, Seoul (KR); Janghee Lee, Seoul (KR); Seonil Yu, Seoul (KR); Taejin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 440 days.

(21) Appl. No.: 17/970,787

(22) Filed: Oct. 21, 2022

(65) Prior Publication Data

US 2024/0015814 A1    Jan. 11, 2024

(30) Foreign Application Priority Data

Jul. 11, 2022   (KR) .......................... 10-2022-0085121

(51) Int. Cl.
*H04W 76/10* (2018.01)
*H04R 5/04* (2006.01)
(Continued)

(52) U.S. Cl.
CPC .............. *H04W 76/11* (2018.02); *H04R 5/04* (2013.01); *H04W 4/80* (2018.02); *H04R 2420/07* (2013.01); *H04R 2499/15* (2013.01)

(58) Field of Classification Search
CPC ............ H04B 7/18528; H04B 7/18571; H04B 7/18576; H04B 2201/71346;
(Continued)

(56) References Cited

U.S. PATENT DOCUMENTS 10,560,654 B2 *  2/2020  Lee ................... H04N 21/43615
11,863,966 B2 *  1/2024  Bouvigne ............... G06F 3/165
(Continued)

FOREIGN PATENT DOCUMENTS

KR   10-2018-0028703 A   3/2018
KR   10-2018-0038166 A   4/2018
(Continued)

OTHER PUBLICATIONS

Bluetooth User Interface Flow Diagrams for Bluetooth Secure Simple Pairing Devices, Revision V1.0, 54 pages, Sep. 13, 2007.*
(Continued)

*Primary Examiner* — Frank Duong
(74) *Attorney, Agent, or Firm* — Birch, Stewart, Kolasch & Birch, LLP

(57) ABSTRACT

A display device including a display; a Bluetooth circuit; an Infrared (IR) circuit; and a controller configured to receive an IR signal including an IR keycode from an external speaker via the IR circuit, determine an identification of the external speaker based on the received IR keycode, control the Bluetooth circuit to begin searching for the external speaker, receive an advertising signal advertising a presence of the external speaker, the advertising signal including an identification of the external speaker, and Bluetooth pairing the display device and the external speaker thought the Bluetooth circuit when the identification of external speaker included in the advertising signal matches the determined identification of the external speaker.

20 Claims, 15 Drawing Sheets

(51) Int. Cl.
*H04W 4/80* (2018.01)
*H04W 76/11* (2018.01)

(58) Field of Classification Search
CPC .......... H04N 21/4104; H04N 21/4108; H04N 21/43615; H04N 21/43637; H04N 21/439; H04W 4/80; H04W 12/003; H04W 12/00305; H04W 12/004; H04W 12/00407; H04W 12/47; H04W 12/50; H04W 76/11; H04W 84/06; H04R 5/04; H04R 2420/07; H04R 2499/15
See application file for complete search history.

(56) References Cited

U.S. PATENT DOCUMENTS

| | | | | |
|---|---|---|---|---|
| 12,004,061 | B2* | 6/2024 | Peng | ............... H04M 1/72415 |
| 2011/0028091 | A1* | 2/2011 | Higgins | ............. H04L 63/0492 |
| | | | | 455/41.2 |
| 2013/0029596 | A1 | 1/2013 | Preston et al. | |
| 2018/0020495 | A1 | 1/2018 | Nakayama et al. | |
| 2018/0077375 | A1 | 3/2018 | Lee et al. | |
| 2018/0103229 | A1 | 4/2018 | Yang et al. | |
| 2019/0089925 | A1* | 3/2019 | Lee | .......................... H04N 7/06 |
| 2022/0124415 | A1 | 4/2022 | Lee et al. | |

FOREIGN PATENT DOCUMENTS

| | | |
|---|---|---|
| KR | 10-2020-0016825 A | 2/2020 |
| KR | 10-2021-0030469 A | 3/2021 |
| WO | WO 2016/151995 A1 | 9/2016 |

OTHER PUBLICATIONS

"Bluetooth User Interface Flow Diagrams for Bluetooth Secure Simple Pairing Devices," Bluetooth SIG (Usability Expert Group), Sep. 13, 2007, XP002668327, URL: <https://www.bluetooth.org/Technical/Specifications/whitepapers.htm>.

* cited by examiner

DISPLAY DEVICE AND AUDIO OUTPUT SYSTEM

CROSS-REFERENCE TO RELATED APPLICATIONS

This application claims priority to Korean Patent Application No. 10-2022-0085121 filed on Jul. 11, 2022, in Korea, the entire contents of which is hereby expressly incorporated by reference into the present application.

BACKGROUND OF THE DISCLOSURE

Digital TV services using wired or wireless communication networks provide various services not provided in the analog broadcasting service. For example, Internet Protocol Television (IPTV) and smart TV services, which are types of digital TV services, provide bidirectional services allowing users to actively select the type and viewing times of TV shows. The IPTV and smart TV services also provide various additional services, such as Internet search services, home shopping services, and online game serves, based on the bidirectional characteristic.

In addition, the TV can also transmit audio data output from the TV to an external speaker through a Bluetooth-connection. Accordingly, the user can enjoy a surround sound effect. However, according to the related art, the user must perform a complex procedure to Bluetooth-connect the TV to the external speaker.

SUMMARY OF THE DISCLOSURE

Accordingly, one object of the present disclosure is to provide a simplified connection procedure between a display device and an external speaker.

Another object of the present disclosure is to connect a display device to an external speaker in response to a pressed button provided in the external speaker, one time, thereby providing the convenience of connection.

According to an embodiment of the present disclosure, a display device may include a display, a Bluetooth circuit, an IR circuit to receive an Infrared (IR) keycode from an external speaker, and a controller to generate a random key set, as the IR keycode is received, display a key input window, which includes the generated random key set, on the display, receive an IR keycode set from the external speaker, and make a Bluetooth-connection with the external speaker through the Bluetooth circuit, when the received IR keycode set is matched to the random key set.

According to an embodiment of the present disclosure, an audio output system may include an external speaker, and a display deice. The external speaker may receive an input for selecting a first button, and transmit an IR code, which is previously set, to the display device, in response to the input received. The display device may generate a random key set, as the IR keycode is received, display a key input window including the generated random key set, receive an IR keycode set from the external speaker, and make a Bluetooth-connection with the external speaker through a Bluetooth circuit, when the received IR keycode set is matched to the random key set.

As described above, according to an embodiment of the present disclosure, a user can easily connect an external speaker to a display device through a single input to a button provided in the external speaker without a complex process. Accordingly, the convenience of connection is greatly improved. Also, when a plurality of display devices are provided, a user may easily Bluetooth-connect a desired display device to an external speaker by handling a button provided in the external speaker.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

The display device according to an embodiment of the present disclosure is, for example, an intelligent display device in which a computer support function is added to a broadcast reception function and is faithful to a broadcast reception function and has an Internet function added thereto, such as a handwritten input device, a touch screen Alternatively, a more user-friendly interface such as a spatial remote control may be provided. In addition, it is connected to the Internet and a computer with the support of a wired or wireless Internet function, so that functions such as e-mail, web browsing, banking, or games can also be performed. A standardized general-purpose OS may be used for these various functions.

Accordingly, in the display device described in the present disclosure, various user-friendly functions can be performed because various applications can be freely added or deleted, for example, on a general-purpose OS kernel. More specifically, the display device may be, for example, a network TV, HBBTV, smart TV, LED TV, OLED TV, and the like, and may be applied to a smart phone in some cases.

Figure 1:
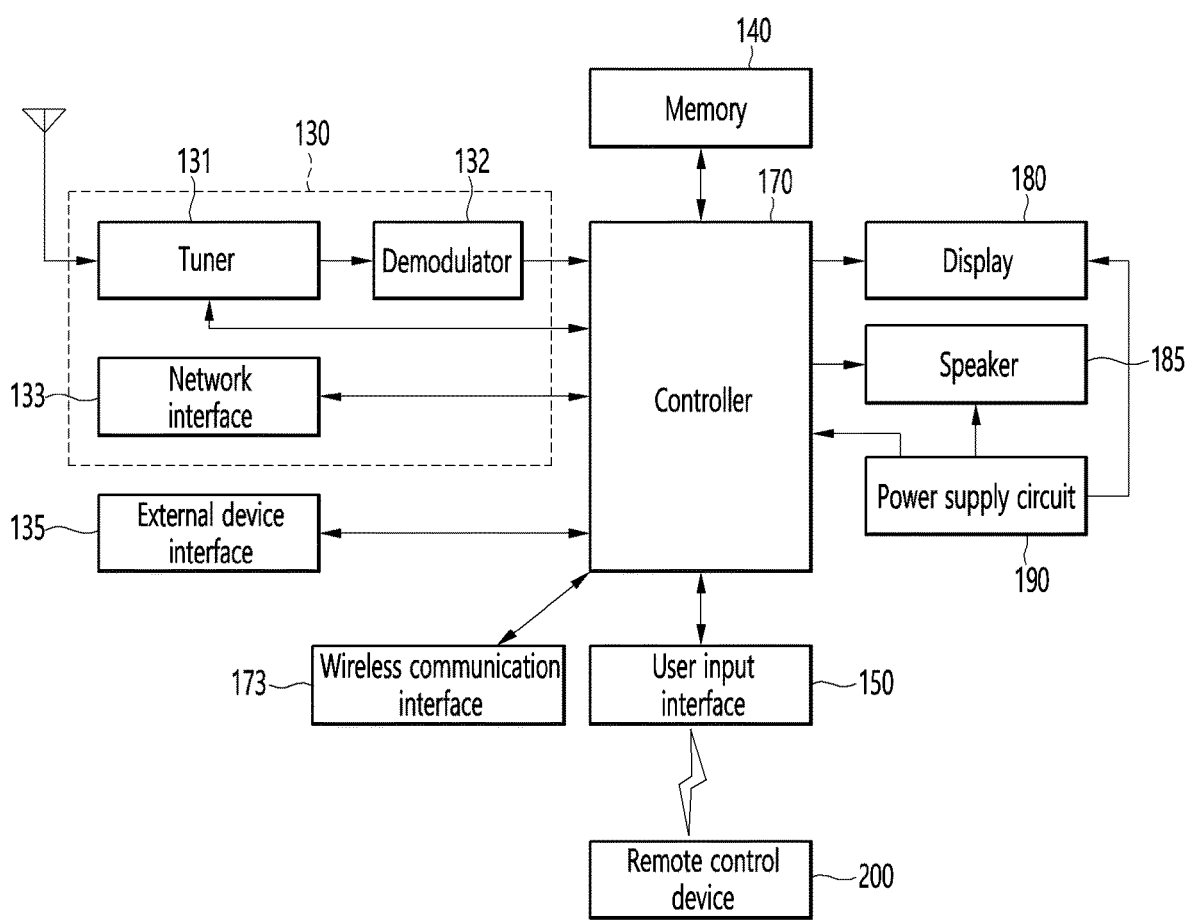
FIG. 1 is a block diagram illustrating the configuration of a display device according to an embodiment of the present invention.

FIG. 1 is a block diagram showing a configuration of a display device according to an embodiment of the present disclosure. Referring to FIG. 1, a display device 100 includes a broadcast receiver 130, an external device interface 135, a memory 140, a user input interface 150, a controller 170, a wireless communication interface 173, a display 180, a speaker 185, and a power supply circuit 190.

As shown in FIG. 1, the broadcast receiving unit 130 includes a tuner 131, a demodulator 132, and a network interface 133. In particular, the tuner 131 selects a specific broadcast channel according to a channel selection command. The tuner 131 can also receive a broadcast signal for the selected specific broadcast channel.

The demodulator 132 separates the received broadcast signal into an image signal, an audio signal, and a data signal related to a broadcast program, and restore the separated image signal, audio signal, and data signal to a format capable of being output. Further, the external device interface 135 can receive an application or a list of applications in an external device adjacent thereto and transmit the same to the controller 170 or the memory 140.

The external device interface 135 also provides a connection path between the display device 100 and an external device. The external device interface 135 can receive one or more of images and audio output from an external device connected to the display device 100 in a wired or wireless manner and transmit the same to the controller 170. The external device interface 135 may include a plurality of external input terminals corresponding to an RGB terminal, one or more High Definition Multimedia Interface (HDMI) terminals, and a component terminal, for example.

The image signal of the external device input and the audio signal of the external device input through the external device interface 135 is output through the speaker 185. The external device connectable to the external device interface 135 may be any one of a set-top box, a Blu-ray player, a DVD player, a game machine, a sound bar, a smartphone, a PC, a USB memory, and a home theater, but this is only an example.

Further, the network interface 133 provides an interface for connecting the display device 100 to a wired/wireless network including an Internet network. The network interface 133 can transmit or receive data to or from other users or other electronic devices through a connected network or another network linked to the connected network.

In addition, a part of content data stored in the display device 100 can be transmitted to a selected user among a selected user or a selected electronic device among other users or other electronic devices registered in advance in the display device 100. Further, the network interface 133 can access a predetermined web page through the connected network or the other network linked to the connected network. That is, it is possible to access a predetermined web page through a network and transmit or receive data to or from a corresponding server.

In addition, the network interface 133 can receive content or data provided by a content provider or a network operator. That is, the network interface 133 can receive content such as movies, advertisements, games, VOD, and broadcast signals and information related thereto provided from a content provider or a network provider through a network.

In addition, the network interface 133 can receive update information and update files of firmware provided by the network operator, and transmit data to an Internet or content provider or a network operator. The network interface 133 can select and receive a desired application from among applications that are open to the public through a network.

Further, the memory 140 stores programs for signal processing and control of the controller 170, and can store images, audio, or data signals, which have been subjected to signal-processed. In addition, the memory 140 can perform a function for temporarily storing images, audio, or data signals input from an external device interface 135 or the network interface 133, and store information on a predetermined image through a channel storage function. The memory 140 can also store an application or a list of applications input from the external device interface 135 or the network interface 133.

The display device 100 can play back a content file (e.g., a moving image file, a still image file, a music file, a document file, an application file, or the like) stored in the memory 140 and provide the same to the user. The user input interface 150 can transmit a signal input by the user to the controller 170 or a signal from the controller 170 to the user. For example, the user input interface 150 can receive and process a control signal such as power on/off, channel selection, screen settings, and the like from the remote control device 200 in accordance with various communication methods, such as a Bluetooth communication method, a WB (Ultra Wideband) communication method, a ZigBee communication method, an RF (Radio Frequency) communication method, or an infrared (IR) communication method or can perform processing to transmit the control signal from the controller 170 to the remote control device 200.

In addition, the user input interface 150 can transmit a control signal input from a local key such as a power key, a channel key, a volume key, and a setting value to the controller 170. Further, the image signal image-processed by the controller 170 can be input to the display 180 and displayed as an image corresponding to a corresponding image signal. Also, the image signal image-processed by the controller 170 can be input to an external output device through the external device interface 135.

The audio signal processed by the controller 170 can be output to the speaker 185. Also, the audio signal processed by the controller 170 can be input to the external output device through the external device interface 135. In addition, the controller 170 controls the overall operation of the display device 100.

In addition, the controller 170 can control the display device 100 by a user command input through the user input interface 150 or an internal program and connect to a network to download an application a list of applications or applications desired by the user to the display device 100. The controller 170 can control the channel information or the like selected by the user to be output through the display 180 or the speaker 185 along with the processed image or audio signal.

In addition, the controller 170 can output an image signal or an audio signal through the display 180 or the speaker 185, according to a command for playing back an image of an external device through the user input interface 150, the image signal or the audio signal being input from an external device, for example, a camera or a camcorder, through the external device interface 135. Further, the controller 170 control the display 180 to display an image, for example, a broadcast image input through the tuner 131 or an external input image input through the external device interface 135, an image input through the network interface unit or an image stored in the memory 140. In this instance, an image being displayed on the display 180 may be a still image or a moving image and may be a 2D image or a 3D image.

In addition, the controller 170 can play back content stored in the display device 100, received broadcast content, or external input content input from the outside, and the content may have various forms such as a broadcast image, an external input image, an audio file, still images, accessed web screens, and document files.

Further, the wireless communication interface 173 can communicate with an external device through wired or wireless communication. The wireless communication interface 173 can perform short range communication with an external device. For example, the wireless communication interface 173 can support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi(Wireless-Fidelity), Wi-Fi Direct, and Wireless USB (Wireless Universal Serial Bus) technologies. The wireless communication interface 173 can also support wireless communication between the display device 100 and a wireless communication system, between the display device 100 and another display device 100, or between the display device 100 and a network in which the display device 100 (or an external server) is located through wireless area networks. The wireless area networks may be wireless personal area networks, for example.

Here, the other display device 100 may be a wearable device (e.g., a smartwatch, smart glasses or a head mounted display (HMD), a mobile terminal such as a smart phone, which can exchange data (or interwork) with the display device 100 according to the present disclosure. The wireless communication interface 173 can also detect (or recognize) a wearable device capable of communication around the display device 100.

Furthermore, when the detected wearable device is an authenticated device to communicate with the display device 100 according to the present disclosure, the controller 170 can transmit at least a portion of data processed by the display device 100 to the wearable device through the wireless communication interface 173. Therefore, a user of the wearable device can use data processed by the display device 100 through the wearable device.

The display 180 can also convert image signals, data signals, and OSD signals processed by the controller 170, or image signals or data signals received from the external device interface 135 into R, G, and B signals, and generate drive signals. Because the display device 100 shown in FIG. 1 is only an embodiment of the present disclosure, some of the illustrated components may be integrated, added, or omitted depending on the specification of the display device 100 that is actually implemented. That is, two or more components may be combined into one component, or one component may be divided into two or more components as needed. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 can receive an image through the network interface 133 or the external device interface 135 without a tuner 131 and a demodulator 132 and play back the same. For example, the display device 100 can be divided into an image processing device, such as a set-top box, for receiving broadcast signals or content according to various network services, and a content playback device that plays back content input from the image processing device.

In this instance, an operation method of the display device according to an embodiment of the present disclosure will be described below may be implemented by not only the display device 100 as described with reference to FIG. 1 and but also one of an image processing device such as the separated set-top box and a content playback device including the display 180 the audio output unit 185.

Next, a remote control device according to an embodiment of the present disclosure will be described with reference to FIGS. 2 and 3. In particular, FIG. 2 is a block diagram of a remote control device, and FIG. 3 illustrates an example remote control device 200 according to an embodiment of the present disclosure.

Figure 2:
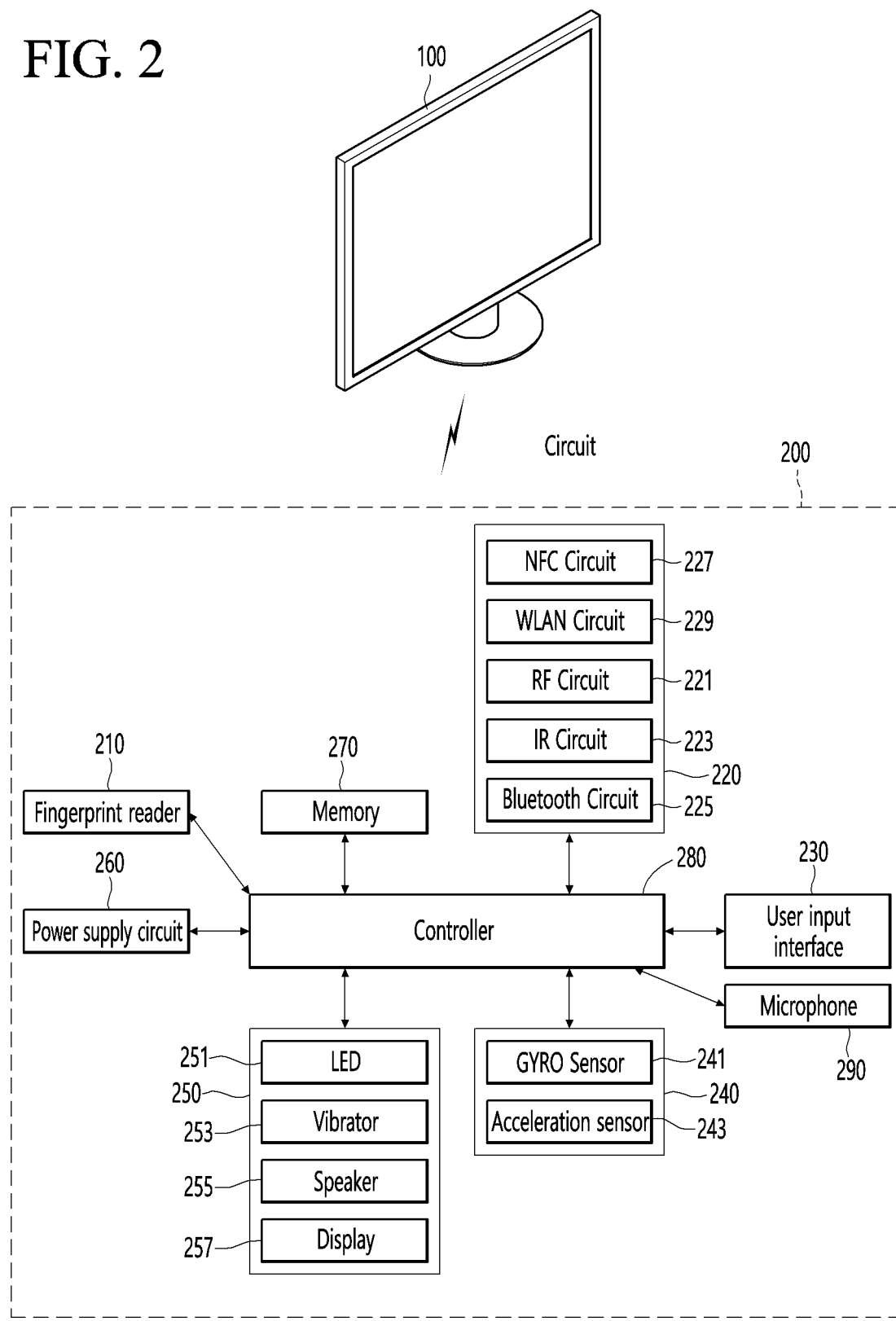
FIG. 2 is a block diagram of a remote control device according to an embodiment of the present invention.
Figure 3:
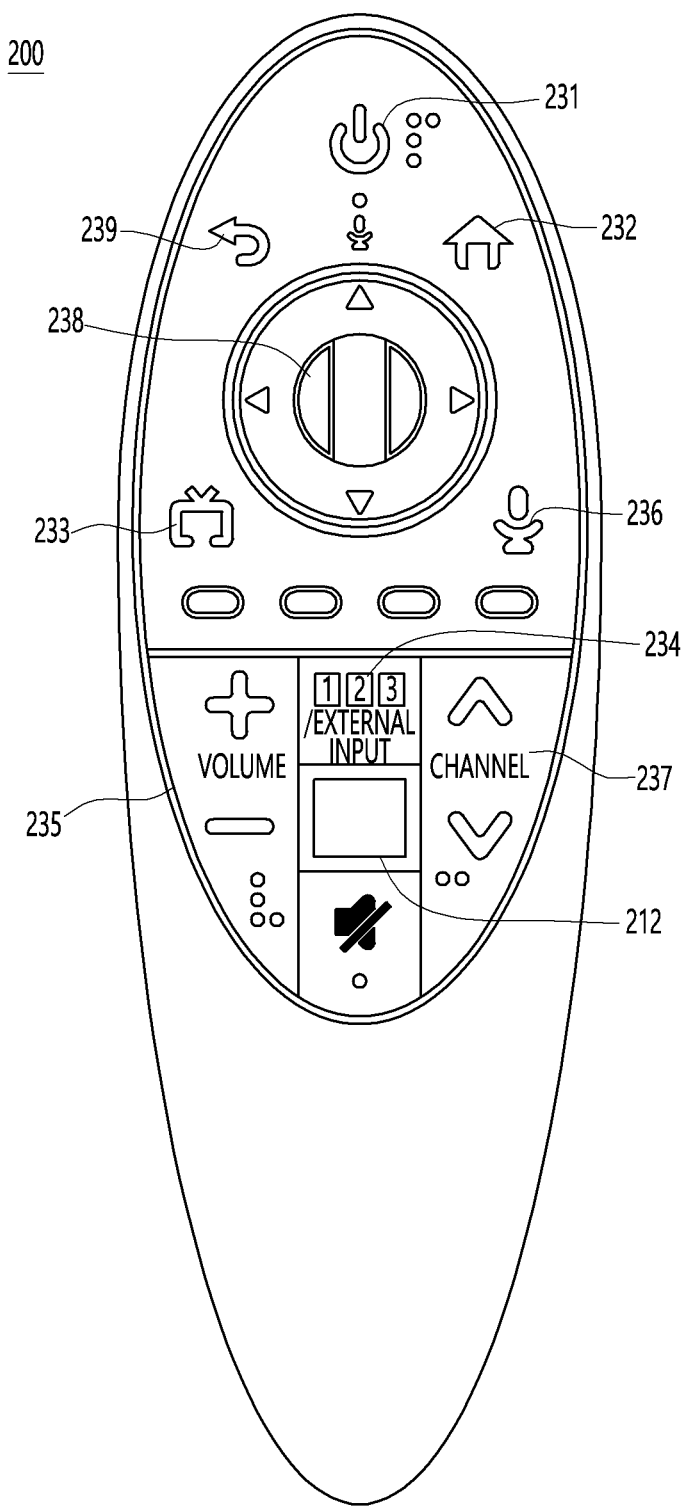
FIG. 3 is an overview illustrating a remote control device according to an embodiment of the present invention.

First, the remote control device 200 in FIG. 2 includes a fingerprint reader 210, a wireless communication circuit 220, a user input interface 230, a sensor 240, an output interface 250, a power supply circuit 260, a memory 270, a controller 280, and a microphone 290. In more detail, the wireless communication circuit 220 cam transmit and receive signals to and from any one of display devices according to embodiments of the present disclosure described above.

As shown, the remote control device 200 includes an RF circuit 221 for transmitting and receiving signals to and from the display device 100 according to the RF communication standard, and an IR circuit 223 for transmitting and receiving signals to and from the display device 100 according to the IR communication standard. In addition, the remote control device 200 includes a Bluetooth circuit 225 for transmitting and receiving signals to and from the display device 100 according to the Bluetooth communication standard. In addition, the remote control device 200 includes an NFC circuit 227 for transmitting and receiving signals to and from the display device 100 according to the NFC (near field communication) communication standard, and a WLAN circuit 229 for transmitting and receiving signals to and from the display device 100 according to the wireless LAN (WLAN) communication standard.

In addition, the remote control device 200 can transmit a signal containing information on the movement of the remote control device 200 to the display device 100 through the wireless communication circuit 220. The remote control device 200 can also receive a signal transmitted by the display device 100 through the RF circuit 221, and transmit a command regarding power on/off, channel change, volume adjustment, or the like to the display device 100 through the IR circuit 223.

The user input interface 230 may include a keypad, a button, a touch pad, a touch screen, or the like. The user can thus input a command related to the display device 100 to the remote control device 200 by operating the user input interface 230. When the user input interface 230 includes a hard key button, the user can input a command related to the display device 100 to the remote control device 200 through a push operation of the hard key button. Details will be described with reference to FIG. 3.

Referring to FIG. 3, the remote control device 200 may include a plurality of buttons such as a fingerprint recognition button 212, a power button 231, a home button 232, a live button 233, an external input button 234, a volume control button 235, a voice recognition button 236, a channel change button 237, an OK button 238, and a back-play button 239. The fingerprint recognition button 212 recognizes a user's fingerprint and in one embodiment can enable a push operation, and thus receive a push operation and a fingerprint recognition operation. The power button 231 is used for turning on/off the power of the display device 100.

The home button 232 is used to move to the home screen of the display device 100, and live button 233 is used for displaying a real-time broadcast program. Further, the external input button 234 is used for receiving an external input connected to the display device 100, and the volume control button 235 is used for adjusting the level of the volume output by the display device 100.

In addition, the voice recognition button 236 is used for receiving a user's voice and recognizing the received voice, and the channel change button 237 is used for receiving a broadcast signal of a specific broadcast channel. The OK button 238 can be used for selecting a specific function, and the back-play button 239 can be used for returning to a previous screen.

A description will be given referring again to FIG. 2. When the user input interface 230 includes a touch screen, the user can input a command related to the display device 100 to the remote control device 200 by touching a soft key of the touch screen. In addition, the user input interface 230 may include various types of user input mechanisms such as a scroll key or a jog key, and the present embodiment does not limit the scope of the present disclosure.

Further, the sensor 240 may include a gyro sensor 241 or an acceleration sensor 243 for sensing information regarding the movement of the remote control device 200. For example, the gyro sensor 241 can sense information about the operation of the remote control device 200 based on the x, y, and z axes, and the acceleration sensor 243 can sense information about the moving speed of the remote control device 200. The remote control device 200 may further include a distance measuring sensor to sense the distance between the display device 100 and the display 180.

The output interface 250 can output an image or audio signal corresponding to the operation of the user input interface 230 or a signal transmitted from the display device 100. The user can recognize whether the user input interface 230 is operated or whether the display device 100 is controlled through the output interface 250. For example, the output interface 450 may include an LED 251 that emits light, a vibrator 253 that generates vibration, a speaker 255 that outputs sound, or a display 257 that outputs an image when the user input interface 230 is operated or a signal is transmitted and received to and from the display device 100 through the wireless communication unit 225.

In addition, the power supply circuit 260 supplies power to the remote control device 200 and can stop the power supply when the remote control device 200 has not moved for a predetermined time to reduce power consumption. The power supply circuit 260 can also restart the power supply when a predetermined key provided in the remote control device 200 is operated.

Further, the memory 270 can store various types of programs and application data used for control or operation of the remote control device 200. When the remote control device 200 transmits and receives signals wirelessly through the display device 100 and the RF circuit 221, the remote control device 200 and the display device 100 transmit and receive signals through a predetermined frequency band.

In addition, the controller 280 of the remote control device 200 can store and refer to information on a frequency band capable of wirelessly transmitting and receiving signals to and from the display device 100 paired with the remote control device 200 in the memory 270. The controller 280 can control all matters related to the control of the remote control device 200. For example, the controller 280 can transmit a signal corresponding to a predetermined key operation of the user input interface 230 or a signal corresponding to the movement of the remote control device 200 sensed by the sensor 240 through the wireless communication unit 225. Also, the microphone 290 of the remote control device 200 can obtain speech, and a plurality of microphones 290 may be provided.

Figure 4:
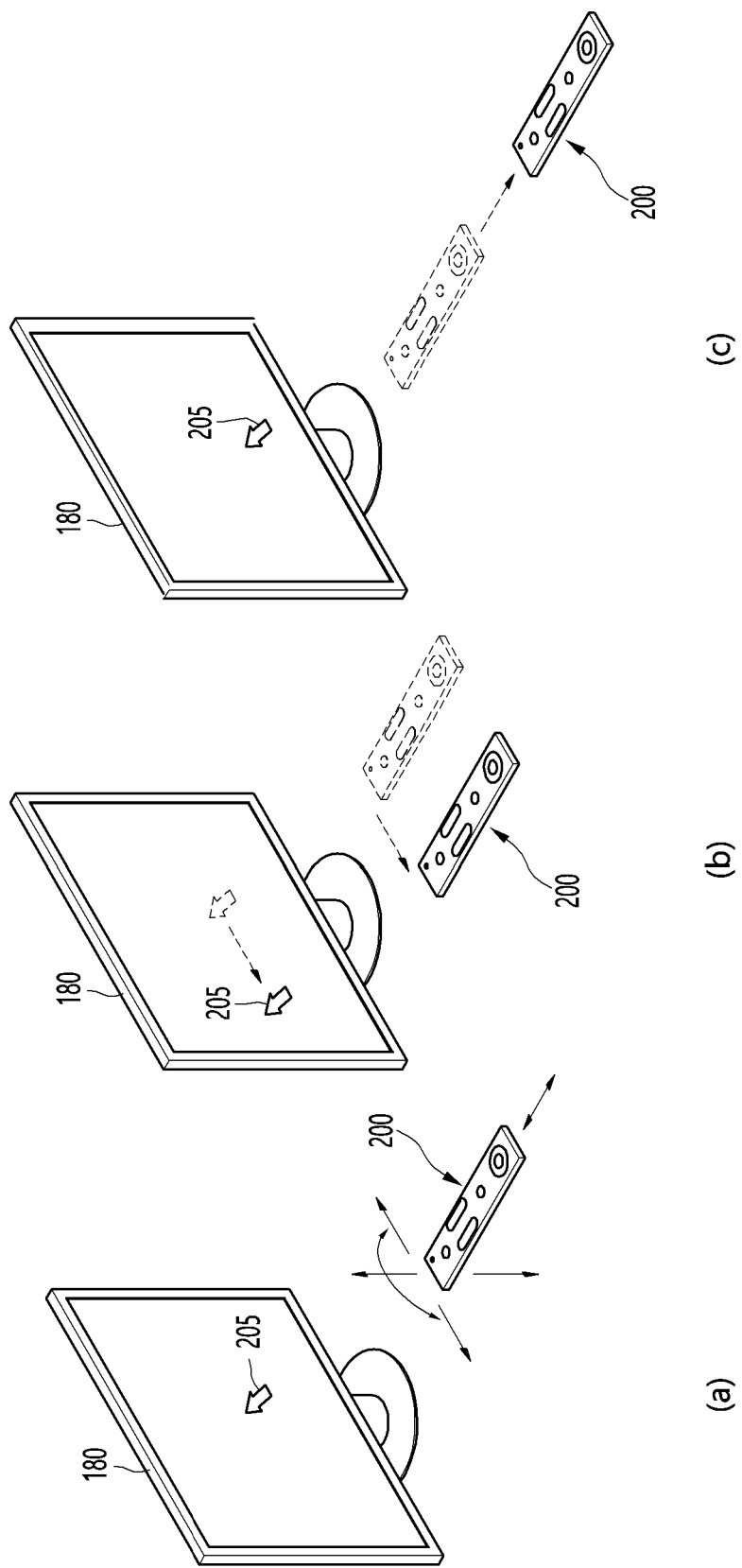
FIG. 4 is an overview illustrating using a remote control device according to an embodiment of the present invention.

Next, FIG. 4 shows an example of using a remote control device according to an embodiment of the present disclosure. In particular, FIG. 4(a) illustrates that a pointer 205 corresponding to the remote control device 200 is displayed on the display 180. The user can move or rotate the remote control device 200 up, down, left, and right. The pointer 205 displayed on the display 180 of the display device 100 then corresponds to the movement of the remote control device 200. As shown in the drawings, the pointer 205 is moved and displayed according to movement of the remote control device 200 in a 3D space, so the remote control device 200 can be called a space remote control device.

FIG. 4(b) illustrates that when the user moves the remote control device 200 to the left, the pointer 205 displayed on the display 180 of the display device 100 moves to the left correspondingly. Information on the movement of the remote control device 200 detected through a sensor of the remote control device 200 is transmitted to the display device 100. The display device 100 can calculate the coordinates of the pointer 205 based on information on the movement of the remote control device 200. The display device 100 can also display the pointer 205 to correspond to the calculated coordinates.

FIG. 4(c) illustrates a user moving the remote control device 200 away from the display 180 while pressing a specific button in the remote control device 200. Accordingly, a selected area in the display 180 corresponding to the pointer 205 can be zoomed in and displayed enlarged. Conversely, when the user moves the remote control device 200 to be close to the display 180, the selected area in the display 180 corresponding to the pointer 205 can be zoomed out and displayed reduced.

On the other hand, when the remote control device 200 moves away from the display 180, the selected area can be zoomed out, and when the remote control device 200 moves to be close to the display 180, the selected area can be zoomed in. Also, when a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements are recognized. When a specific button in the remote control device 200 is not being pressed, only the pointer 205 moves according to the up, down, left, or right movements of the remote control device 200.

Further, the movement speed or the movement direction of the pointer 205 can correspond to the movement speed or the movement direction of the remote control device 200. In the present specification, a pointer refers to an object displayed on the display 180 in response to an operation of the remote control device 200. Accordingly, objects of various shapes other than the arrow shape shown in the drawings are possible as the pointer 205. For example, the object may be a dot, a cursor, a prompt, a thick outline, and the like. In addition, the pointer 205 can be displayed corresponding to any one point among points on a horizontal axis and a vertical axis on the display 180, and also be displayed corresponding to a plurality of points such as a line and a surface.

Figure 5:
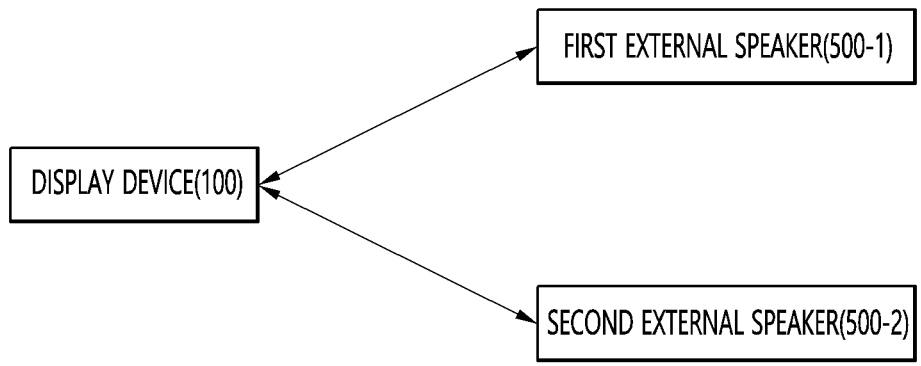
FIG. 5 is a block diagram illustrating an audio output system according to an embodiment of the present disclosure.

Next, FIG. 5 is a block diagram illustrating an audio output system 50 according to an embodiment of the present disclosure. As shown, the audio output system 50 includes a display device 100 and one or more external speakers 500-1 and 500-2. The display device 100 can also establish a Bluetooth-connection to any of the external speakers.

In particular, the display device 100 can perform a pairing and connection processes with respect to an external speaker. Thereafter, the display device 100 can transmit audio data to the external speaker, and the external speaker can output the audio based on the audio data. The display device 100 and the one or more external speakers 500-1 and 500-2 can thus output the audio to produce surround sound effects.

Figure 6A:
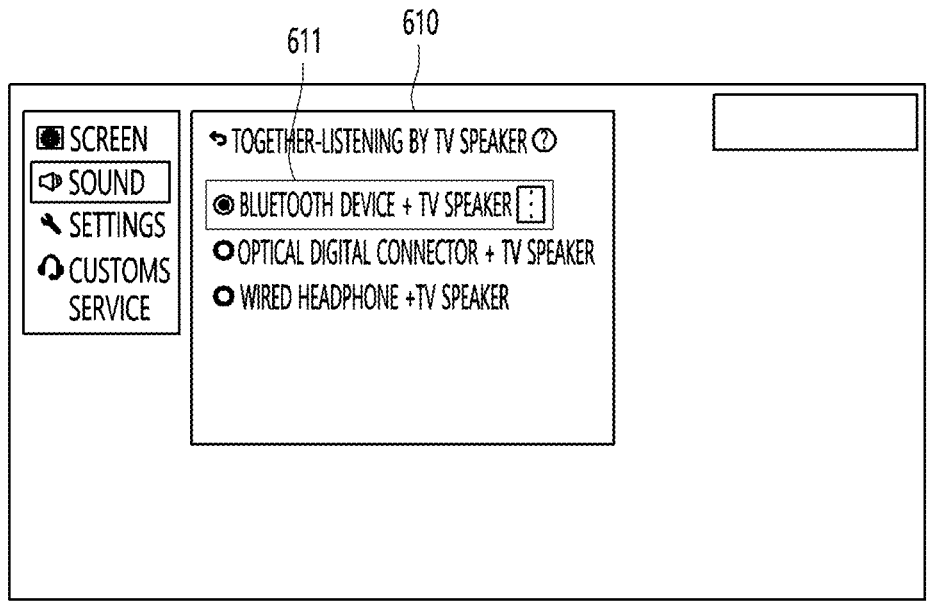
FIGS. 6A to 6D are overviews illustrating a related art connection process between a display device and an external speaker.

Next, FIGS. 6A to 6D are overviews illustrating a related art connection process between a display device and an external speaker. Referring to FIG. 6A, the display device 100 displays a together-listening menu 610 in response to a selection input to a sound item on a menu.

Figure 6B:
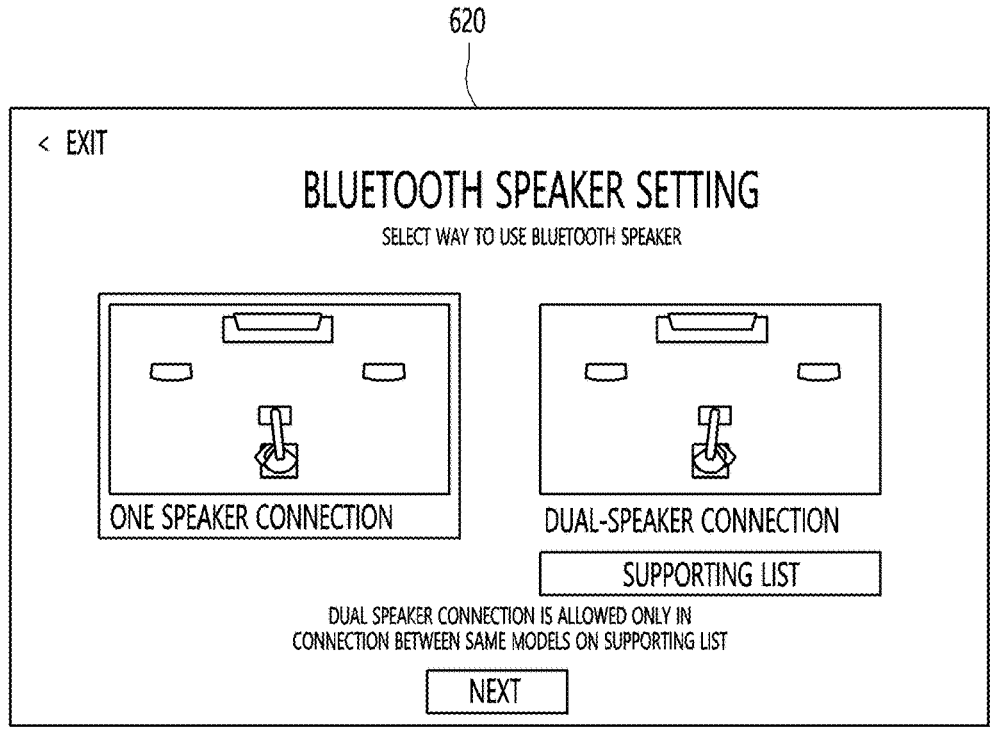

As shown, the together-listening menu 610 includes a surround mode item 611 which provides a surround sound effect through a Bluetooth device, such as the external speaker, and a speaker provided in the display device 100. When the surround mode item 611 is selected, as shown in FIG. 6B, the display device 100 displays a speaker setting screen 620 showing whether to set one external speaker or two external speakers.

Figure 6C:
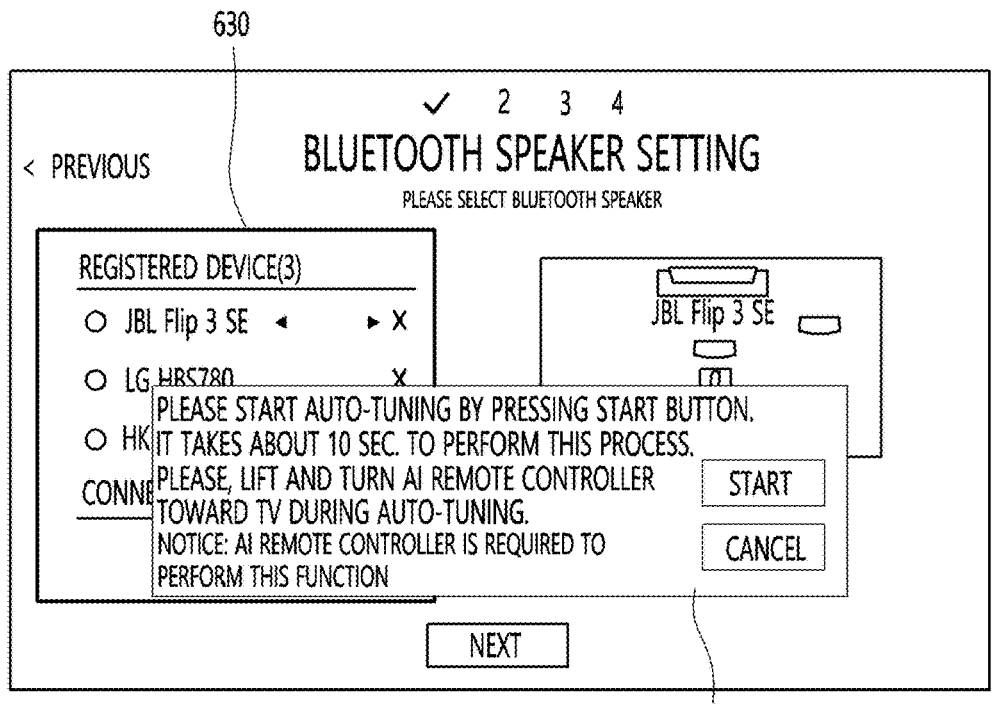

When one external speaker is set, as shown in FIG. 6C, the display device 100 displays a device list 630 including registered devices and connectable devices. The user selects the external speaker to be connected through the device list 630. Thereafter, audio tuning for the external speaker is performed through a tuning pop-up window 631.

Figure 6D:
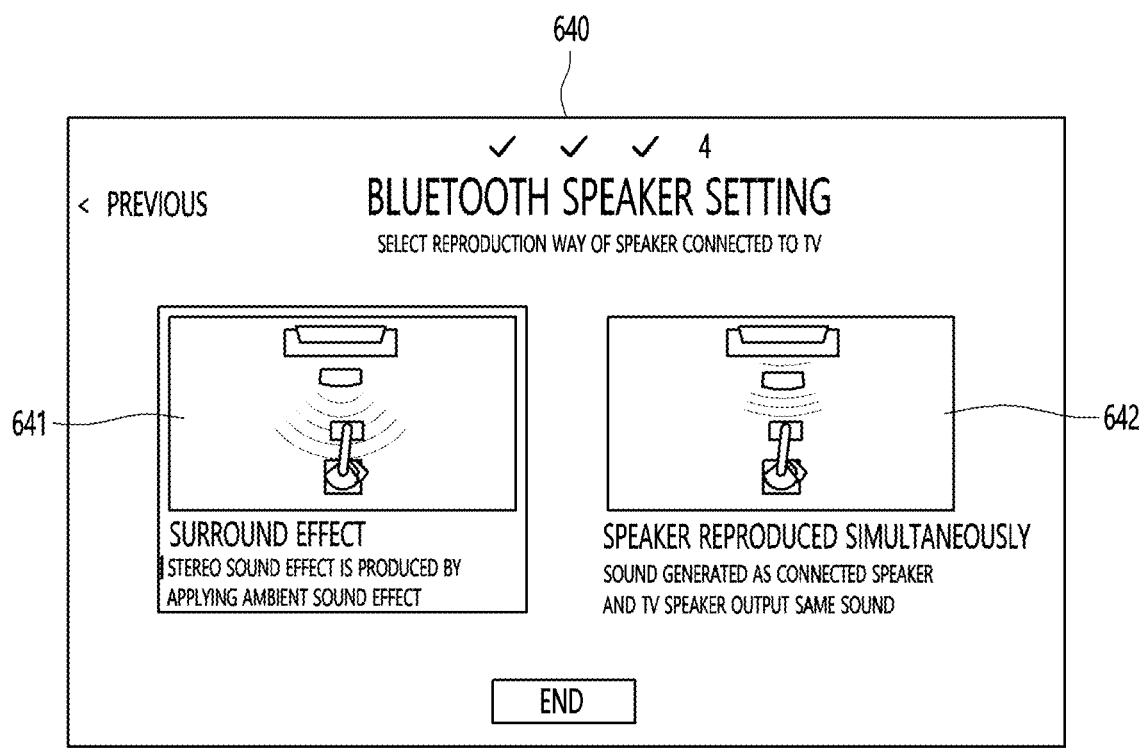

Thereafter, as shown in FIG. 6D, the display device 100 displays a reproduction type selecting screen 640 including a surround effect item 641 and a speaker-simultaneously reproducing item 642. The surround effect item 641 is for outputting a main audio through the speaker of the display device 100 and outputting an ambient audio through the external speaker to output a stereo audio.

The speaker-simultaneously reproducing item 642 is for outputting the same sound through the display device speaker and the external speaker. The display device 100 can receive a command for selecting the surround effect item 641 to enter a surround mode. As described above, a complex process is required by the user to establish a Bluetooth-connection between the display device 100 and the external speaker.

Figure 7:
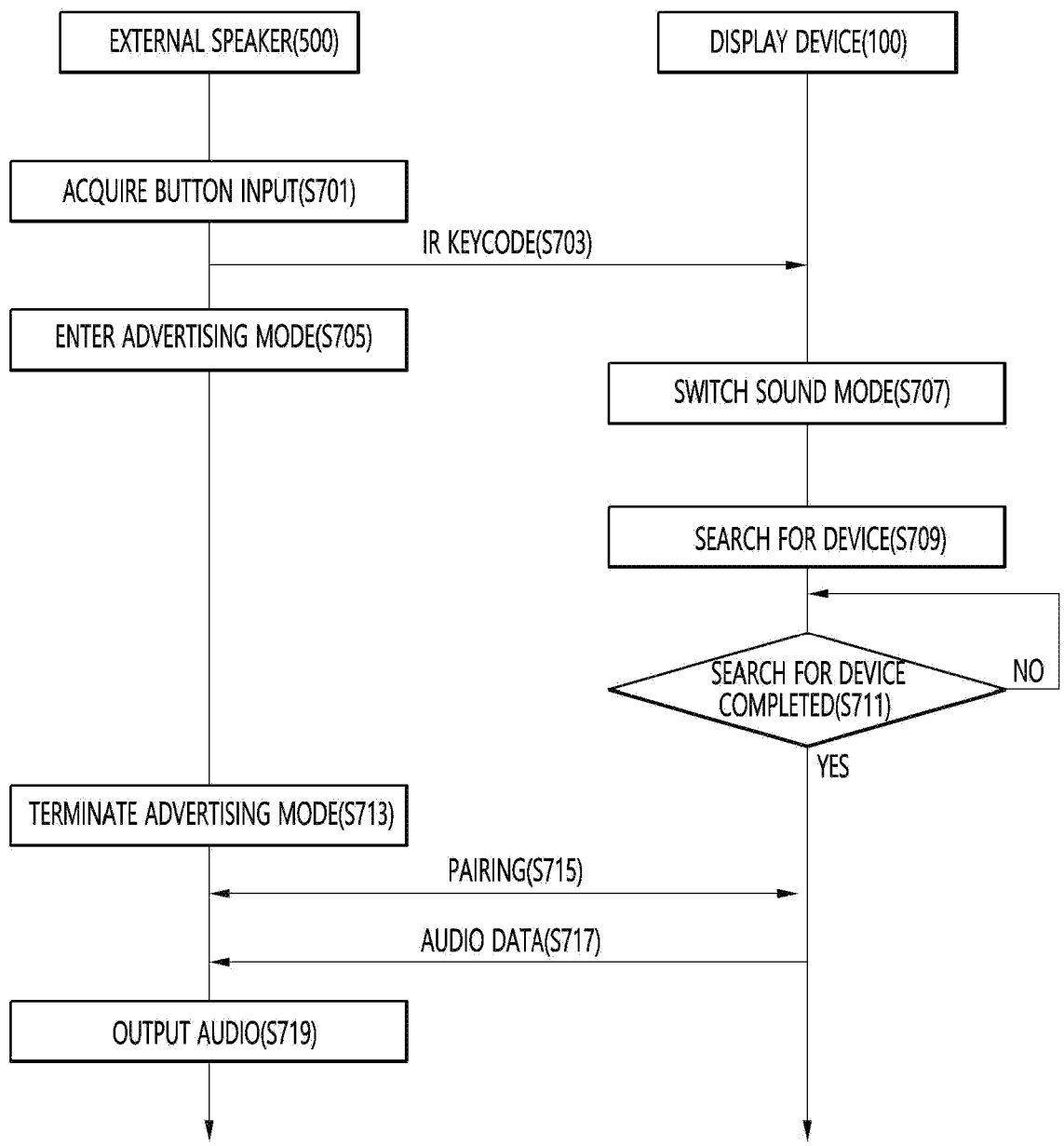
FIG. 7 is a flowchart illustrating a method for operating an audio output system according to an embodiment of the present disclosure.

Next, FIG. 7 is a flowchart illustrating a method for operating an audio output system according to an embodiment of the present disclosure. In particular, FIG. 7 illustrates a Bluetooth-connection process between the display device 100 and one external speaker 500. The external speaker 500 may include an IR circuit, a Bluetooth circuit, one or more physical buttons, an audio output module, and a processor, for example.

Referring to FIG. 7, the external speaker 500 receives a button input for triggering a Bluetooth-connection to the display device 100 (S701). The external speaker 500 then acquires a preset IR keycode in response to the button input. In more detail, the preset IR keycode can be a specific code used for connection between the display device 100 and the external speaker 500 through Bluetooth communication. The external speaker 500 then transmits the acquired preset IR keycode to the display device 100 (S703).

The value of the IR keycode may be '0x82', as an example. The external speaker 500 can also transmit the IR keycode to the display device 100 through IR communication and after transmitting the IR keycode, the external speaker 500 enters an advertising mode (S705).

According to an embodiment, the advertising mode corresponds to transmitting an advertising signal for notifying or advertising the presence of the external speaker to other devices. The advertising signal includes identification information of the external speaker 500 such as a Bluetooth medium access control (MAC) address and the name of the external speaker 500.

In addition, in response to receiving the IR keycode from the external speaker 500, the controller 170 of the display device 100 switches a first sound mode to a second sound mode (S707). The second sound mode may include the surround mode and a simultaneously-output mode. In particular, the surround mode outputs the main audio through the speaker of the display device 100 and a sub-audio through the external speaker 500.

The sub-audio can be an ambient audio, such as background music, when a video is reproduced. In addition, the simultaneously-output mode corresponds to the speaker of the display device 100 and the external speaker 500 outputting the same audio. According to another embodiment, the controller 170 can set the sound mode to any one of the surround mode or the simultaneously-output mode, in response to receiving the IR keycode.

After switching the sound mode, the controller 170 of the display device 100 searches for a Bluetooth device using previously stored device information (S709). The device information may include at least one of the MAC address of the Bluetooth device or the name of the Bluetooth device. According to an embodiment, the memory 140 of the display device 100 can store the IR keycode and an MAC address of a Bluetooth device corresponding to the IR keycode. The Bluetooth MAC address indicates information on a production place of the Bluetooth device, for example.

The controller 170 can search for the device having the Bluetooth MAC address stored in the memory 140 using the Bluetooth circuit included in the wireless communication interface 173. The controller 170 of the display device 100 determines whether a process (device search process) of searching for the device is completed, after searching for the device (S711).

When the previously stored Bluetooth MAC address is matched to the MAC address included in the advertising signal, the controller 170 can determine the device search process as being completed. When the device search process is completed (Yes in S711), the controller 170 of the display device 100 can notify the device search process has completed to the external speaker 500. Accordingly, the external speaker 500 terminates the advertising mode (S713).

When the Bluetooth MAC address of the external speaker 500 is matched to the previously stored Bluetooth MAC address, the controller 170 can transmit a message for notifying address matching to the external speaker 500. The external speaker 500 can terminate the advertising mode based on the received message. Thereafter, the external speaker 500 and the display device 100 perform Bluetooth pairing (S715).

The Bluetooth pairing is a process in which the display device 100 registers the external speaker 500 for the Bluetooth-connection. In other words, the display device 100 can store the Bluetooth MAC address and a device name in the memory 140. After the pairing is completed, the controller 170 of the display device 100 transmits the audio data to the external speaker 500 (S717), and the external speaker 500 outputs an audio based on the received audio data (S719). The controller 170 can transmit audio data corresponding to the sub-audio to the external speaker 500 through the Bluetooth circuit, depending on the surround mode.

Figure 8:
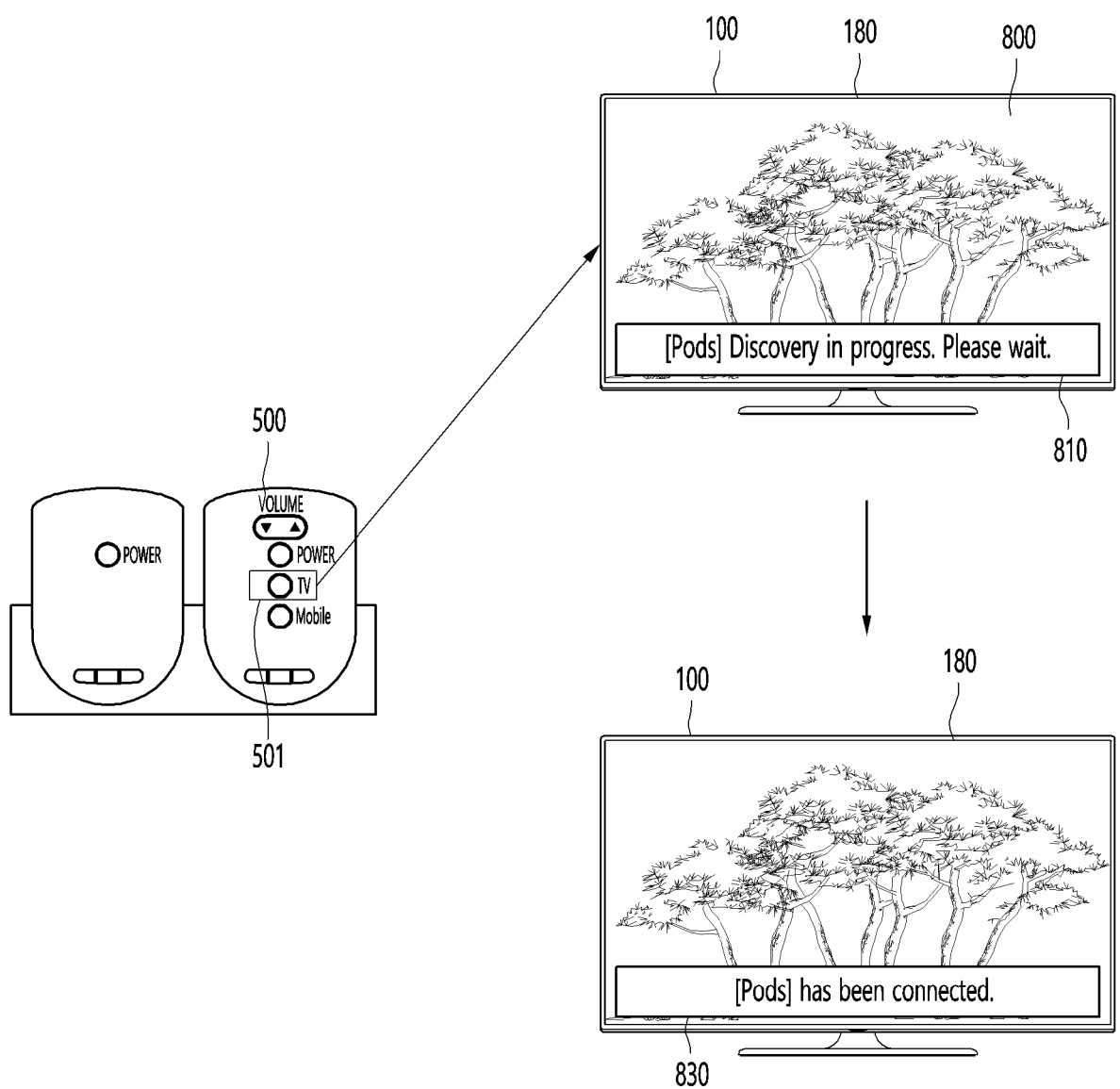
FIG. 8 is an overview illustrating a process of Bluetooth-connecting an external speaker to a display device by a single button input according to an embodiment of the present disclosure.

Next, FIG. 8 is an overview illustrating a process of Bluetooth-connecting an external speaker to a display device by a single button input according to an embodiment of the present disclosure. Referring to FIG. 8, a user can select a first button 501 provided in the external speaker 500.

The external speaker 500 then transmits a preset IR keycode to the display device 100, when the first button 501 is selected. The display device 100 then triggers a process of searching for a Bluetooth device, when receiving the IR keycode. In other words, the display device 100 searches for the Bluetooth device, when receiving the IR keycode.

The display device 100 can display, on the display 180, a device search pop-up window 810 showing that the device search process is in progress, in response to receiving the IR keycode during the reproduction of a content image 800. The display device 100 can determine whether the previously stored Bluetooth MAC address matches the MAC address included in the advertising signal received from the external speaker 500, and determine the device search process is completed, when the two MAC addresses are matched.

The display device 100 can perform the pairing for the external speaker 500, and display, on the display 180, a connection completion pop-up window 830 showing that the Bluetooth-connection to the external speaker 500 is completed. As described above, according to an embodiment of the present disclosure, the user can easily connect the display device 100 to the external speaker by a single input of the button provided in the external speaker without a complex process. Accordingly, the convenience of connection is greatly improved.

Figure 9:
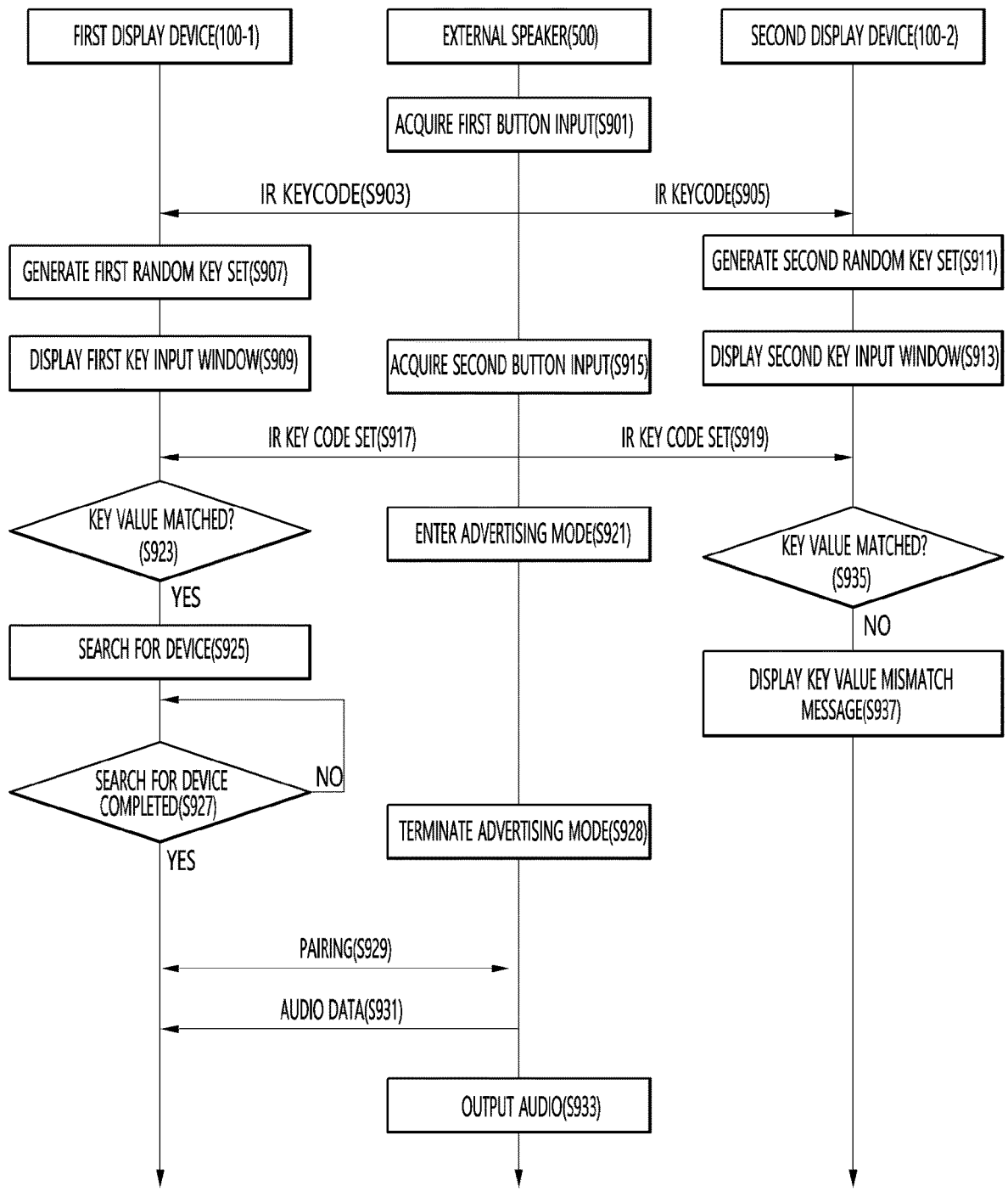
FIG. 9 is a flowchart illustrating a method for operating an audio output system according to another embodiment of the present disclosure.

Next, FIG. 9 is a flowchart illustrating a method for operating an audio output system according to another embodiment of the present disclosure. More specifically, FIG. 9 illustrates any one of a plurality of display devices 100-1 and 100-2 being Bluetooth-connected to the external speaker 500.

In FIG. 9, each of the first display device 100-1 and the second display device 100-2 may include components shown in FIG. 1. In addition, in the following description of the steps in FIG. 9, the description of duplicative steps of FIG. 7 are omitted to avoid redundancy.

As shown in FIG. 9, the external speaker 500 acquires a first button input (S901) and transmits an IR keycode to the first display device 100-1 and the second display device 100-2 based on the acquired first button (S903 and S905). The first button input is used for triggering a Bluetooth-connection with the display device by the external speaker 500.

In response to the selection of the first button, the external speaker 500 then transmits a preset IR keycode to each of the first display device 100-1 and the second display device 100-2 through the IR circuit. The controller 170 of the first display device 100-1 then generates a first random key set based on the received IR keycode (S907) and displays a first key input window including the generated first random key set on the display 180 (S909).

When the received IR keycode is the same as the previously stored IR keycode, the controller 170 of the first display device 100-1 can determine that a trigger for Bluetooth-connection is recognized. The controller 170 of the first display device 100-1 then generates the first random key set, when receiving the IR keycode, and displays the first key input window including the first random key set on the display 180.

The first random key set may be the combination of four-digit keycodes. The value of each keycode may be either '0x83' or '0x84', for example. The controller 170 of the second display device 100-2 generates a second random key set based on the received IR keycode (S911) and displays a second key input window including the generated second random key set on the display 180 (S913).

The controller 170 of the second display device 100-2 can generate the second random key set, when receiving the IR keycode, and display the second key input window including the second random key set on the display 180. The second random key set may be the combination of four-digit keycodes. The value of each keycode may be either '0x83' or '0x84'. The first random key set and the second random key set may be different from each other to distinguish the display device 100 that the user wants to connect with the external speaker 500.

According to an embodiment, the first display device 100-1 and the second display device 100-2 can generate random key sets and display key input windows, when the first display device 100-1 and the second display device 100-2 are adjacent to each other in distance or position. Also, the first display device 100-1 and the second display device 100-2 can communicate with each other. In addition, the first display device 100-1 and the second display device 100-2 connected to the same router can be determined as the first display device 100-1 and the second display device 100-2 being adjacent to each other.

In addition, the first display device 100-1 and the second display device 100-2 can share connection information of the router with each other. The first display device 100-1 and the second display device 100-2 having the same connection information can be determined as the first display device 100-1 and the second display device 100-2 being adjacent to each other. The connection information may include a service set identifier (SSID), for example.

Further, the external speaker 500 acquires a second button input (S915) and transmits an IR keycode set corresponding to the acquired second button input to each of the first display device 100-1 and the second display device 100-2 (S917 and S919). According to an embodiment, the second button input can correspond to sequentially selecting a plurality of buttons provided in the external speaker 500.

For example, the plurality of buttons may include a volume up button and a volume down button. The keycode value of the volume up button may be '0x83', and the keycode value of the volume down button may be '0x84'. The IR keycode set can be the combination of four-digit keycodes.

After transmitting the IR keycode set, the external speaker 500 enters the advertising mode (S921). The controller 170 of the first display device 100-1 determines whether the generated first random key set is matched to the IR keycode set received from the external speaker 500 (S923). When the generated first random key set is matched to the IR keycode set received from the external speaker 500 (Yes in S923), the controller 170 searches for a device (S925).

According to an embodiment, the controller 170 of the first display device 100-1 can compare the first random key set with the IR keycode set to determine whether the arrangements of values of each set are matched to each other. When the arrangements of values of each set match each other, the controller 170 of the first display device 100-1 can perform a search of the Bluetooth device.

The controller 170 of the first display device 100-1 can compare a Bluetooth MAC address or a device name included in the advertising signal (or a search signal) with a Bluetooth MAC address or a device name previously stored in the memory 140. When the first random key set is matched to the IR keycode set, the first display device 100-1 can set the sound mode to any one of the surround mode and the simultaneously-output mode. Thereafter, a device search process can be performed.

The controller 170 of the first display device 100-1 determines whether the device search process is completed, when the device search process is performed (S927). When the device search process is completed (Yes in S927), the external speaker 500 terminates the advertising mode (S928), and the first display device 100-1 performs Bluetooth pairing for the external speaker 500 (S929).

For example, when the Bluetooth MAC address included in the advertising signal (or search signal) is matched to the previously stored Bluetooth MAC address, the controller 170 of the first display device 100-1 can determine the device search process as being completed. After performing the Bluetooth pairing, the controller 170 of the first display device 100-1 transmits audio data to the external speaker 500 (S931), and the external speaker 500 outputs an audio based on the received audio data (S933).

Further, the controller 170 of the second display device 100-2 determines whether the generated first random key set is matched the IR keycode set received from the external speaker 500 (S935). When the generated first random key set is mismatched from the IR keycode set received from the external speaker 500 (No in S935), the controller 170 displays a key value mismatch message on the display 180 (S937).

Figure 10A:
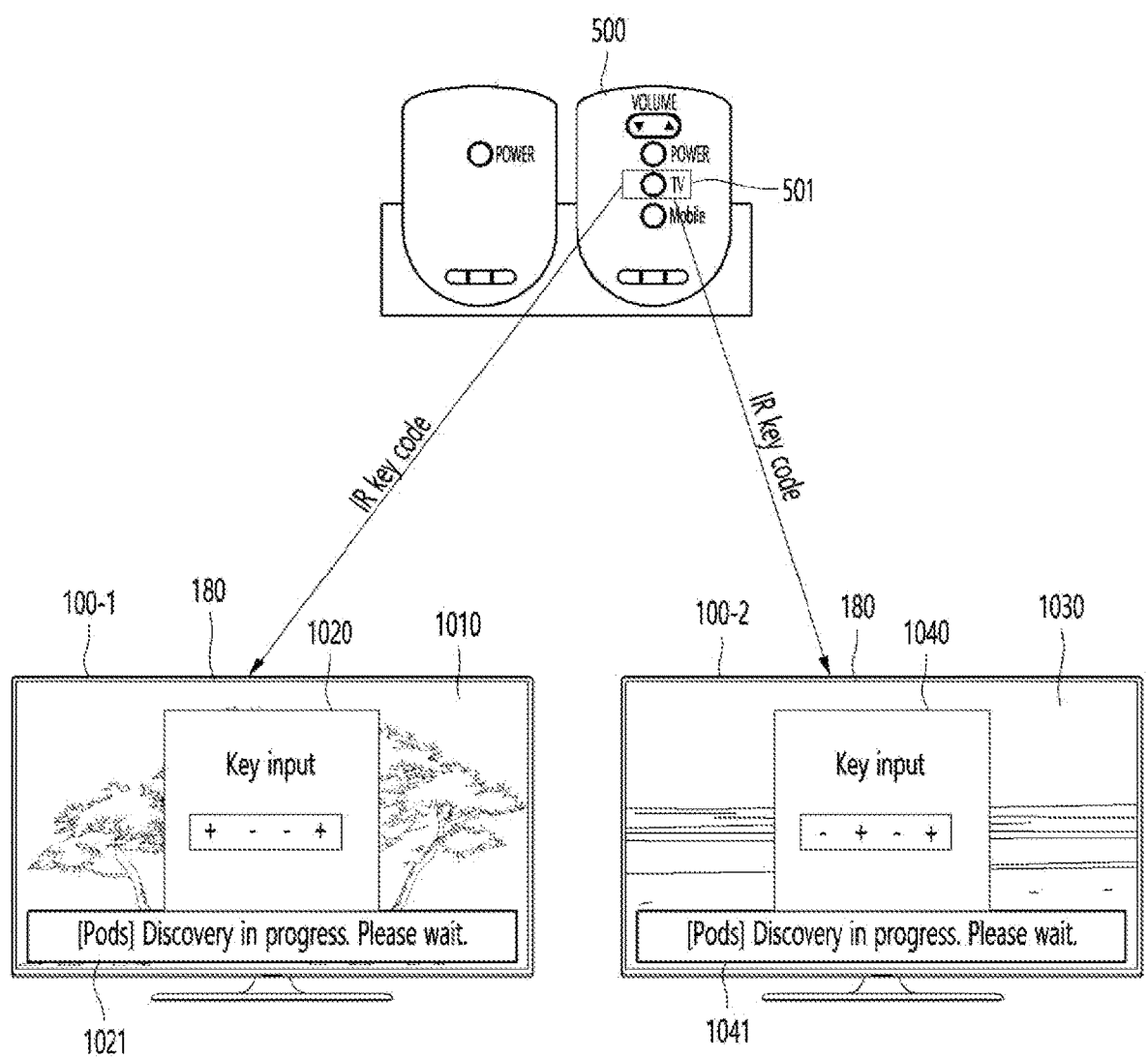
FIGS. 10A and 10B are overviews illustrating a process of Bluetooth-connecting any one of two display devices to an external speaker according to an embodiment of the present disclosure.
Figure 10B:
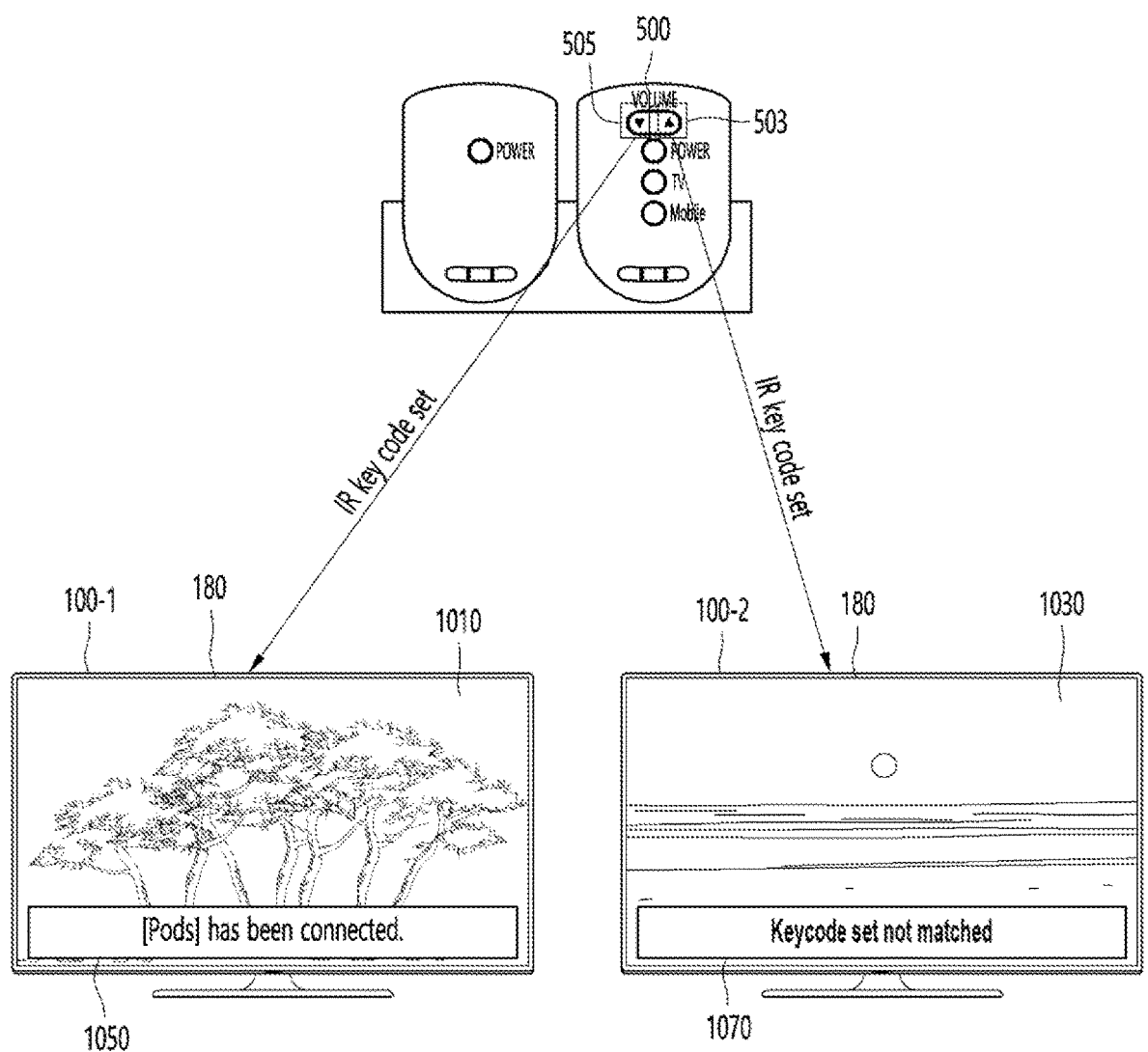

FIGS. 10A and 10B are views showing a process of Bluetooth-connecting any one of two display devices to an external speaker according to an embodiment of the present disclosure. Referring to FIG. 10A, the external speaker 500 transmits a preset IR keycode to each of the first display device 100-1 and the second display device 100-2 as the first button 501 is selected.

The first display device 100-1 displays the first key input window 1020 on the display 180, in response to receiving the IR keycode during the display of the first image 1010. The first display device 100-1 generates a first random key set (+, −, −, and +) when receiving the IR keycode and display a first key input window 1020 including the first random key set. The first display device 100-1 also displays a device search pop-up window 1021 showing that the device search process is in progress.

In addition, the second display device 100-2 displays a second key input window 1040 on the display 180, when receiving the IR keycode during the display of the second image 1030. The second display device 100-2 also generates a second random key set (−, +, −, and +) when receiving the IR keycode and displays a second key input window 1040 including the second random key set. The second display device 100-2 also displays the device search pop-up window 1041 showing that the device search process is in progress.

Referring to FIG. 10B, the external speaker 500 may further include a second button 503 and a third button 505. The second button 503 may be a volume up button, and the third button 505 may be a volume down button. A value of the keycode of '0x83' may correspond to the second button 503, and a value of the keycode of '0x84' may correspond to the third button 505.

A user can determine a desired device, which is to be connected, of the first display device 100-1 and the second display device 100-2 by sequential selecting the second button 503 and the third button 505. For example, the user can input the first random key set (+, −, −, and +) included in the first key input window 1020 through the second button 503 and the third button 505.

When the IR keycode set received from the external speaker 500 is the same as the first random key set, the first display device 100-1 can search for the external speaker 500. The first display device 100-1 can complete the device search process, when the previously stored Bluetooth MAC address is matched to the MAC address included in the advertising signal received from the external speaker 500.

In addition, the first display device 100-1 can perform pairing for the external speaker 500 and display, on the display 180, a connection completion pop-up window 1050 showing that the Bluetooth-connection to the external speaker 500 is completed. When the IR keycode set received from the external speaker 500 is mismatched from the second random key set, the second display device 100-2 can display, on the display 180, a pop-up window 1070 showing that the keycode set is not matched.

As described above, according to an embodiment of the present disclosure, when a plurality of display devices are present, a user can easily perform a Bluetooth-connection to a desired display device by handling a button provided in an external speaker. Accordingly, the external speaker can be prevented from being connected to an undesired display device.

Figure 11:
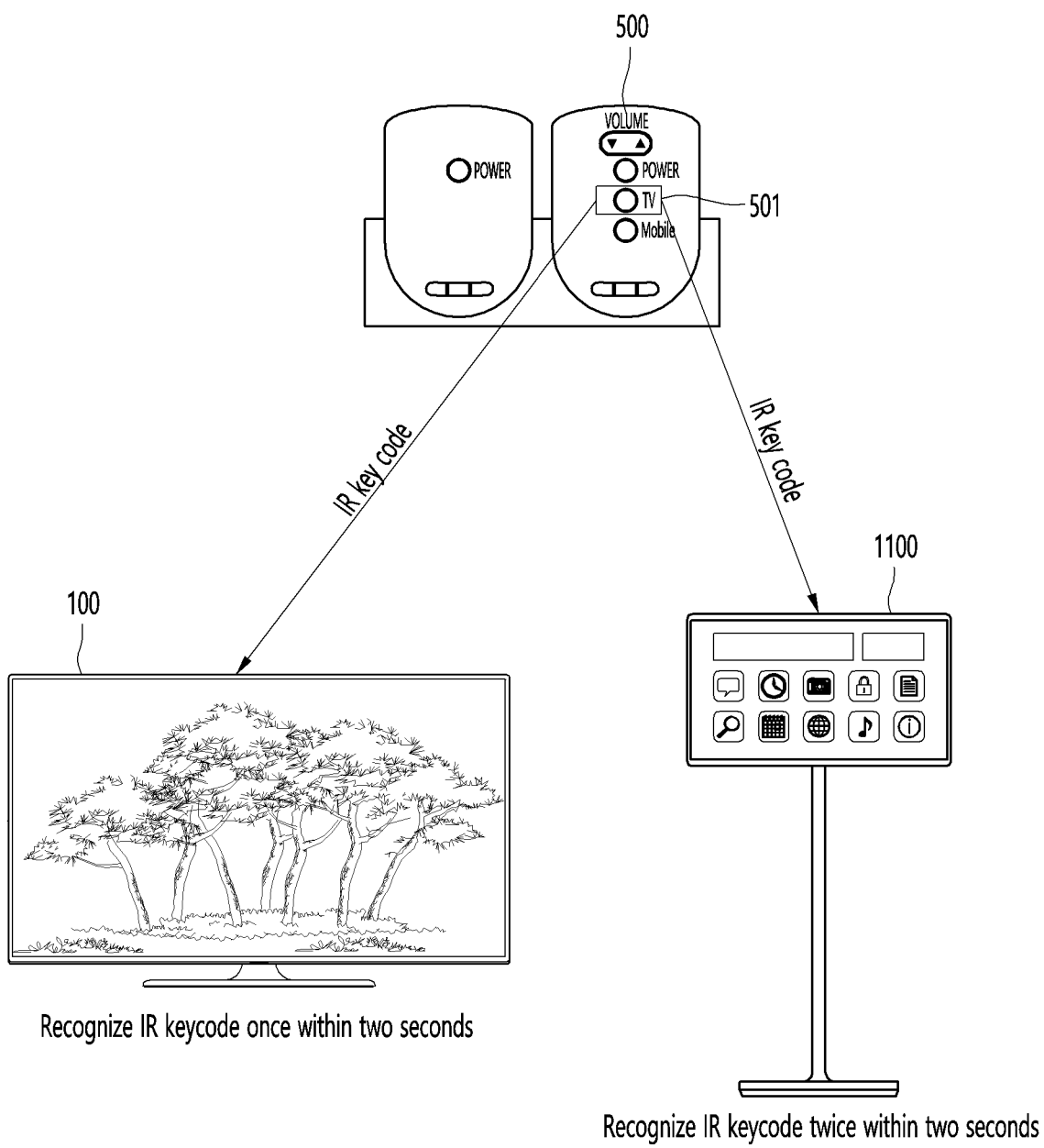
FIG. 11 is an overview illustrating a process of Bluetooth-connecting an external speaker, when different types of display devices are present according to an embodiment of the present disclosure.

Next, FIG. 11 is an overview illustrating a process of Bluetooth-connecting an external speaker when different types of display devices are present according to an embodiment of the present disclosure. FIG. 11 illustrates an example of a general-type display device 100 and a stand-type display device 1100.

When receiving a preset IR keycode once within two seconds, the general type display device 100 can search for the device. In other words, when receiving a preset keycode more than two times within two seconds, the general type display device 100 does not search for the device. When receiving the preset IR keycode once within two seconds, the general type display device 100 generates a random key set and determines whether the generated random key set is matched to the received IR keycode set. The general type display device 100 can search for the device, when the sets are the same as each other.

When recognizing the preset IR keycode twice within two seconds, the stand-type display device 1100 can search for the device. In other words, when receiving the IR keycode only once within two seconds, the stand-type display device 100 does not search for the device. As described above, according to an embodiment of the present disclosure, whether to perform the device search process is determined based on the number of times of receiving the IR keycode for a specific time, with respect to different types of display devices.

Figure 12:
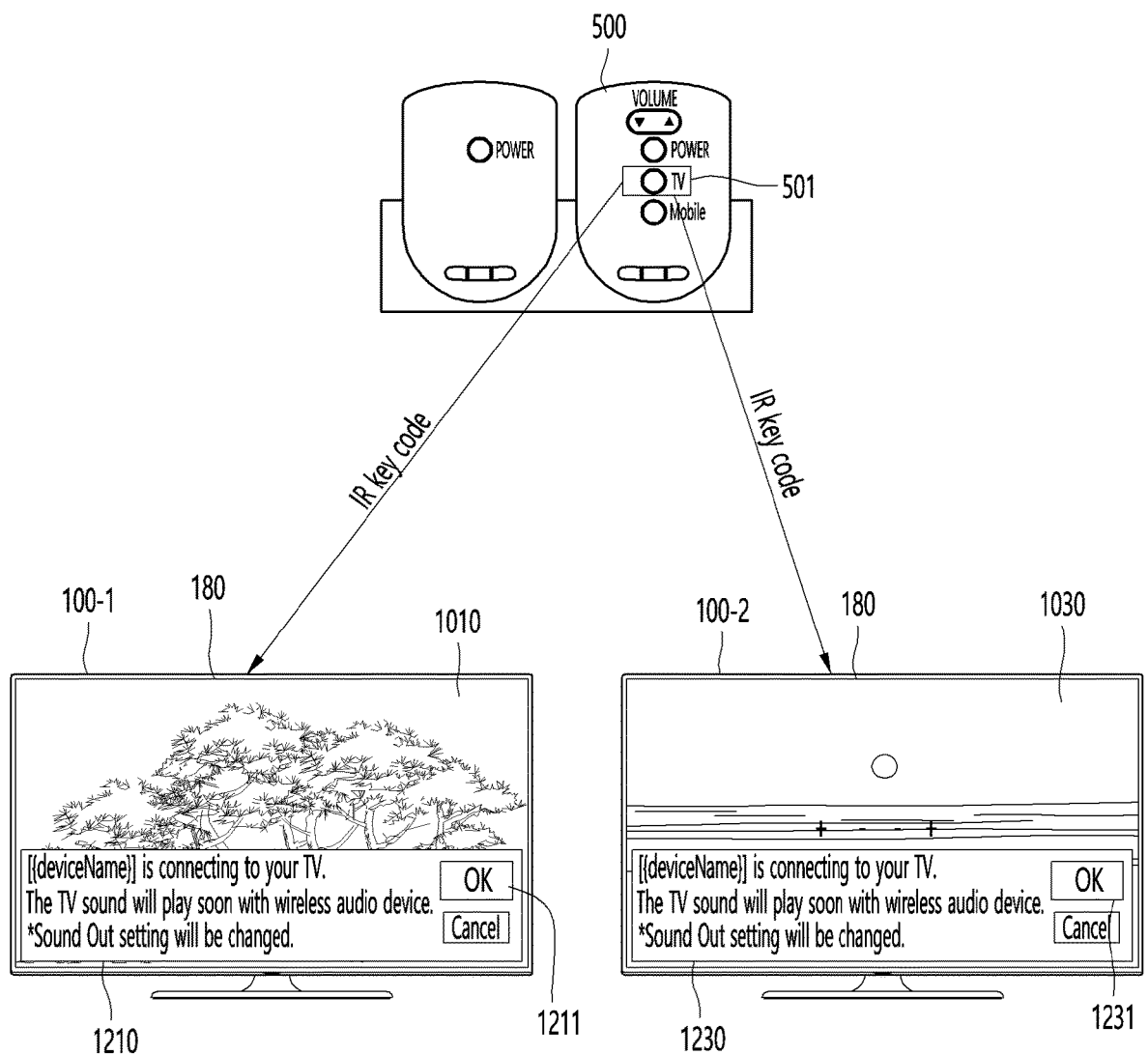
FIG. 12 is an overview illustrating a process of Bluetooth-connecting any one of two display devices to an external speaker according to another embodiment of the present disclosure.

Next, FIG. 12 is an overview illustrating a process of Bluetooth-connecting any one of two display devices to an external speaker according to another embodiment of the present disclosure. Referring to FIG. 12, the external speaker 500 transmits a preset IR keycode to each of the first display device 100-1 and the second display device 100-2, as the first button 501 is selected.

The first display device 100-1 can display a first pop-up window 1210 on the display 180, when receiving an IR keycode during the display of the first image 1010. The first pop-up window 1210 shows whether an attempt to connect the external speaker 500 is detected and a Bluetooth-connection is performed.

In addition, the second display device 100-2 can display a second pop-up window 1230 on the display 180, when receiving the IR keycode during the display of the second image 1030. The second pop-up window 1230 also shows whether an attempt to connect the external speaker 500 is detected and a Bluetooth-connection is performed.

The user can select a desired device, which is to be connected to the external speaker 500, by selecting a first OK button 1211 included in the first pop-up window 1210 and a second OK button 1231 included in the second pop-up window 1230. For example, when receiving a command for selecting the first OK button 1211 from the remote control device 200, the first display device 100-1 can search for the device. When the second display device 100-2 does not receive any command for the second pop-up window 1230 for ten seconds or more, the second display device 100-2 can output an audio through the intrinsic speaker thereof, instead of performing a device search process.

Figure 13:
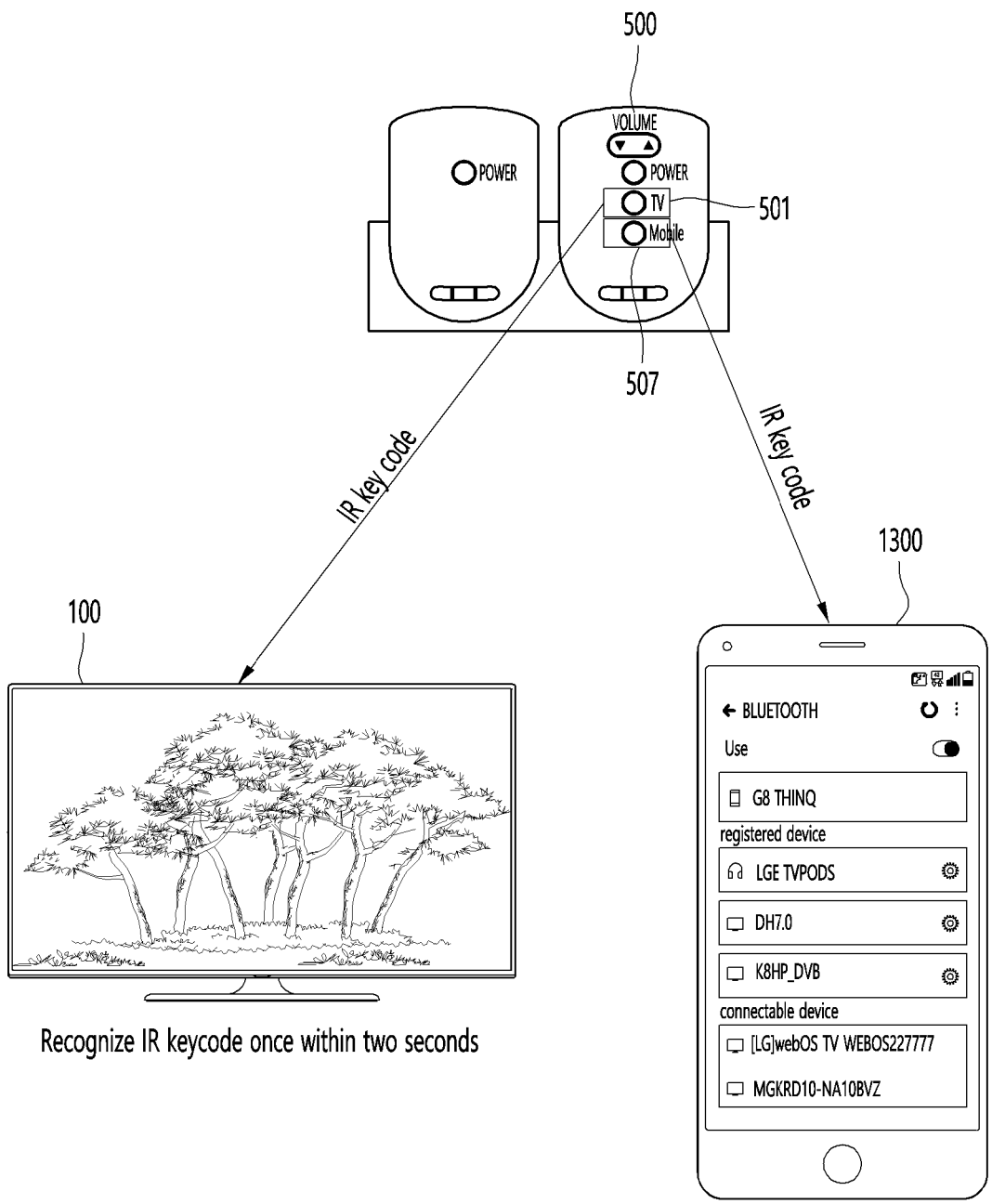
FIG. 13 is an overview illustrating a process of performing a Bluetooth-connection with a device having a connection history through different buttons provided in an external speaker according to an embodiment of the present disclosure.

Next, FIG. 13 is an overview illustrating a process of performing a Bluetooth-connection with a device having a connection history through different buttons provided in an external speaker according to an embodiment of the present disclosure. FIG. 13 illustrates each of the display device 100 and the mobile device 1300 having a Bluetooth-connection history with the external speaker 500. In other words, the external speaker 500 and the display device 100 have previously performed Bluetooth pairing, and the external speaker 500 and the mobile device 1300 have previously performed Bluetooth pairing.

The external speaker 500 can transmit the IR keycode to the display device 100, when receiving an input for selecting the first button 501. Thereafter, the external speaker 500 can be Bluetooth-connected to the display device 100 according to an embodiment of FIG. 7. However, since the Bluetooth pairing has already been performed, a separate pairing process is omitted.

In this state, the external speaker 500 can receive an input for selecting the fourth button 507 used for triggering the Bluetooth-connection to the mobile device 1300. The external speaker 500 can release the Bluetooth-connection to the display device 100 and transmit the IR keycode to the mobile device 1300, in response to an input selecting the fourth button 507.

In addition, the mobile device 1300 can search for a device, based on the received IR keycode and establish a Bluetooth-connection to the external speaker 500. As described above, according to an embodiment of the present disclosure, the user can freely switch a Bluetooth-connection to a desired device through one selection of buttons provided in the external speaker 500.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The above-described display device is not limited to the configuration and method of the above-described embodiments, but the embodiments may be configured by selectively combining all or part of each embodiment such that various modifications can be made.

What is claimed is:

1. A display device comprising:
a display;
a Bluetooth circuit;
an Infrared (IR) circuit; and
a controller configured to:
receive an IR signal including an IR keycode from an external speaker via the IR circuit,
determine an identification of the external speaker based on the received IR keycode,
control the Bluetooth circuit to begin searching for the external speaker,
receive an advertising signal advertising a presence of the external speaker, the advertising signal including the identification of the external speaker, and
Bluetooth pairing the display device and the external speaker through the Bluetooth circuit when the identification of external speaker included in the advertising signal matches the determined identification of the external speaker,
wherein the controller is configured to:
switch a first sound mode of the display device to a second sound mode of the display device, when the received IR keycode is matched to an IR keycode which is previously stored, and
wherein the second sound mode includes one of a surround sound mode in which a main audio is output through a speaker of the display device and a sub-audio is output through the external speaker, and a simultaneously-output mode in which the speaker of the display device and the external speaker output the same audio.

2. The display device of claim 1, wherein the controller is configured to:
determine the identification of the external speaker based on a stored external speaker identifications and corresponding IR keycodes.

3. The display device of claim 2, wherein the identification of external speaker included in the advertising signal and the stored identification of the external speaker comprises Bluetooth medial access control (MAC) address.

4. The display device of claim 1, wherein the controller is configured to:
transmit audio data to the external speaker through the Bluetooth circuit after the Bluetooth pairing is performed.

5. A non-transitory computer readable medium storing computer-executable instructions that when executed by a processor of a display device, cause the processor to perform the operations of:
receiving an IR signal including an IR keycode from an external speaker via the IR circuit;
determining an identification of the external speaker based on the received IR keycode;
begin searching, via Bluetooth, for the external speaker;
receiving an advertising signal advertising a presence of the external speaker, the advertising signal including the identification of the external speaker; and Bluetooth pairing the display device and the external speaker through the Bluetooth circuit when the identification of external speaker included in the advertising signal matches the determined identification of the external speaker, wherein the IR signal is received from the external speaker in response to a button selected on the external speaker for triggering a Bluetooth-connection to the display device.

6. A display device comprising:
a display;
a Bluetooth circuit;
an Infrared (IR) circuit; and
a controller configured to:
receive an IR signal including an IR keycode from an external speaker via the IR circuit,
determine an identification of the external speaker based on the received IR keycode,
control the Bluetooth circuit to begin searching for the external speaker,
receive an advertising signal advertising a presence of the external speaker, the advertising signal including the identification of the external speaker, and
Bluetooth pairing the display device and the external speaker through the Bluetooth circuit when the identification of external speaker included in the advertising signal matches the determined identification of the external speaker,
wherein the controller is configured to:
generate a random key set based on the received IR signal including the IR keycode from the external speaker,
display the generated random key set on the display,
receive another IR signal from the external speaker including an IR code key set, and
begin the search for the external speaker when the generated random key set matches the IR code key set.

7. The display device of claim 6, wherein the displayed random key set includes plus and minus symbols representing volume up and volume down buttons on the external speaker.

8. The display device of claim 7, wherein a number of plus and minus symbols is four.

9. A display device comprising:
a display;
a Bluetooth circuit;
an Infrared (IR) circuit; and
a controller configured to:
receive an IR signal including an IR keycode from an external speaker via the IR circuit,
determine an identification of the external speaker based on the received IR keycode,
control the Bluetooth circuit to begin searching for the external speaker,
receive an advertising signal advertising a presence of the external speaker, the advertising signal including the identification of the external speaker, and
Bluetooth pairing the display device and the external speaker through the Bluetooth circuit when the identification of external speaker included in the advertising signal matches the determined identification of the external speaker,
wherein the IR signal is transmitted by the external speaker in response to a button selected on the external speaker for triggering a Bluetooth-connection to the display device.

10. A display device comprising:
a display;
a Bluetooth circuit;
an Infrared (IR) circuit; and
a controller configured to:
receive an IR signal including an IR keycode from an external speaker via the IR circuit,
determine an identification of the external speaker based on the received IR keycode,
control the Bluetooth circuit to begin searching for the external speaker,
receive an advertising signal advertising a presence of the external speaker, the advertising signal including the identification of the external speaker, and
Bluetooth pairing the display device and the external speaker through the Bluetooth circuit when the identification of external speaker included in the advertising signal matches the determined identification of the external speaker,
wherein the controller is further configured to:
control the Bluetooth circuit to transmit an advertising terminating message to the external speaker for notifying the external speaker the identification of external speaker included in the advertising signal matches the stored identification of the external speaker such that the external speaker ceases transmitting the advertising signal.

11. An audio output system, comprising:
at least one display device; and
an external speaker,
wherein the external speaker is configured to:
receive an input of button included on the external speaker for triggering a Bluetooth
connected with the at least one display device,
transmit an IR signal including an IR keycode to the display device, wherein the IR keycode is generated based on the input of the button included on the external speaker,
wherein the display device is configured to:
determine an identification of the external speaker based on the received IR keycode,
control the Bluetooth circuit to begin searching for the external speaker,
receive an advertising signal from the external speaker advertising a presence of the external speaker, the advertising signal including the identification of the external speaker, and
Bluetooth pairing the display device and the external speaker when the identification of external speaker included in the advertising signal matches the determined identification of the external speaker.

12. The audio output system of claim 11, wherein the display device is configured to:
determine the identification of the external speaker based on a stored external speaker identifications and corresponding IR keycodes.

13. The audio output system of claim 12, wherein the identification of external speaker included in the advertising signal and the stored identification of the external speaker comprises Bluetooth medial access control (MAC) address.

14. The audio output system of claim 11, wherein the display device is configured to:
transmit audio data to the external speaker after the Bluetooth pairing is performed.

15. The audio output system of claim 11, wherein the display device is configured to:

switch a first sound mode of the display device to a second sound mode of the display device, when the received IR keycode is matched to an IR keycode which is previously stored, and wherein the second sound mode includes one of a surround sound mode in which a main audio is output through a speaker of the display device and a sub-audio is output through the external speaker, and a simultaneously-output mode in which the speaker of the display device and the external speaker output the same audio.

16. The audio output system of claim 11, wherein the display device is configured to:
generate a random key set based on the received IR signal including the IR keycode from the external speaker,
display the generated random key set on the display,
receive another IR signal from the external speaker including an IR code key set, and
begin the search for the external speaker when the generated random key set matches the IR code key set.

17. The audio output system of claim 16, wherein the displayed random key set includes plus and minus symbols representing volume up and volume down buttons on the external speaker.

18. The audio output system of claim 17, wherein a number of plus and minus symbols is four.

19. The audio output system of claim 11, wherein the display device is further configured to:
transmit an advertising terminating message to the external speaker for notifying the external speaker the identification of external speaker included in the advertising signal matches the stored identification of the external speaker, and
wherein the external speaker ceases transmitting the advertising signal in response to receiving the advertising terminating message from the display device.

20. The audio output system of claim 11, wherein the at least one display device includes multiple display devices in communication with each other.

* * * * *